United States Patent
Childs et al.

(10) Patent No.: US 8,789,662 B2
(45) Date of Patent: Jul. 29, 2014

(54) WHEELED CARRIAGE WITH BRAKE LOCK SYSTEM

(75) Inventors: William D. Childs, Plainwell, MI (US); Steven L. Birman, Otsego, MI (US); William V. Bleeker, Jr., Plainwell, MI (US); Richard L. McDaniel, Constantine, MI (US); Dickson J. Brubaker, Climax, MI (US); Anish Paul, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 221 days.

(21) Appl. No.: 13/585,075

(22) Filed: Aug. 14, 2012

(65) Prior Publication Data

US 2013/0111664 A1  May 9, 2013

Related U.S. Application Data

(60) Provisional application No. 61/557,781, filed on Nov. 9, 2011.

(51) Int. Cl.
*B60B 33/00* (2006.01)
*A61G 7/00* (2006.01)

(52) U.S. Cl.
USPC .............................. 188/1.12; 16/35 R; 5/600

(58) Field of Classification Search
USPC .................... 5/600, 86.1; 188/1.12; 16/35 R; 280/79.1
See application file for complete search history.

(56) References Cited

U.S. PATENT DOCUMENTS

| | | | |
|---|---|---|---|
| 1,630,514 A | 5/1927 | Bayer | |
| 1,633,638 A | 6/1927 | Jarvis et al. | |
| 1,671,774 A | 5/1928 | McIntosh | |
| 1,731,312 A | 10/1929 | Matheson | |
| 2,068,160 A | 1/1937 | Zeindler | |
| 2,081,594 A | 5/1937 | McIntosh | |
| 2,110,227 A | 3/1938 | Koenigkramer et al. | |
| 2,951,258 A | 9/1960 | Brooks et al. | |
| 2,972,163 A | 2/1961 | Ross et al. | |
| 3,304,116 A | 2/1967 | Stryker | |
| 3,828,392 A | 8/1974 | Bolger | |
| 3,881,216 A | 5/1975 | Fontana | |
| 3,890,669 A | 6/1975 | Reinhards | |
| 3,974,542 A | 8/1976 | Timmer et al. | |
| 4,035,864 A | 7/1977 | Schroder | |
| 4,175,783 A | 11/1979 | Pioth | |
| 4,205,413 A | 6/1980 | Collignon et al. | |
| 4,248,445 A * | 2/1981 | Vassar | 280/79.11 |
| 4,276,962 A | 7/1981 | Aulik | |
| 4,333,207 A | 6/1982 | Atwood | |
| 4,349,937 A | 9/1982 | Fontana | |

(Continued)

Primary Examiner — Fredrick Conley
(74) Attorney, Agent, or Firm — Warner Norcross & Judd LLP

(57) ABSTRACT

A wheeled carriage for supporting a patient has a wheeled base having frame members supporting a plurality of caster wheel assemblies and a braking system. A moveable brake lock assembly, a brake lock actuator, and a swivel lock receiver are operatively connected to one of the caster wheel assemblies to define a locking caster wheel assembly. The brake lock assembly comprises an actuating member, a swivel lock member, and a brake member that are interconnected as a unit for simultaneous movement. The brake lock actuator is operable to selectively move the brake lock assembly into an engaged position via engagement with the actuating member such that the swivel lock member engages the swivel lock receiver and the brake member contacts a wheel of the locking caster wheel assembly thereby preventing rotation and swiveling of the wheel.

32 Claims, 12 Drawing Sheets

(56) References Cited

U.S. PATENT DOCUMENTS

| | | | |
|---|---|---|---|
| 4,449,268 A | 5/1984 | Schnuell | |
| 4,669,580 A | 6/1987 | Neville | |
| 4,706,328 A | 11/1987 | Broeske | |
| 4,722,114 A | 2/1988 | Neumann | |
| 4,733,755 A | 3/1988 | Manning | |
| 4,793,445 A | 12/1988 | Collignon et al. | |
| 4,805,259 A | 2/1989 | Kassai | |
| 4,815,161 A | 3/1989 | Timmer et al. | |
| 4,941,552 A | 7/1990 | Screen | |
| 4,953,667 A | 9/1990 | Bigo | |
| 4,985,960 A | 1/1991 | Zun | |
| 4,997,066 A | 3/1991 | Bigo | |
| 5,014,391 A | 5/1991 | Schulte | |
| 5,191,675 A | 3/1993 | Ishikura | |
| RE34,433 E | 11/1993 | Heiligenthal et al. | |
| 5,303,450 A | 4/1994 | Lange | |
| 5,370,408 A | 12/1994 | Eagan | |
| 5,379,866 A | 1/1995 | Pearce et al. | |
| 5,415,252 A | 5/1995 | Estkowski | |
| 5,632,360 A | 5/1997 | Melara | |
| 5,675,864 A | 10/1997 | Chou | |
| 5,765,665 A | 6/1998 | Cheng et al. | |
| 5,984,334 A | 11/1999 | Dugas | |
| 5,988,323 A * | 11/1999 | Chu | 188/1.12 |
| 6,022,042 A | 2/2000 | Hartenstine | |
| 6,240,579 B1 | 6/2001 | Hanson et al. | |
| 6,240,713 B1 | 6/2001 | Thomas | |
| 6,256,812 B1 | 7/2001 | Bartow et al. | |
| 6,264,006 B1 | 7/2001 | Hanson et al. | |
| 6,264,007 B1 | 7/2001 | Norton et al. | |
| 6,336,524 B1 | 1/2002 | Van Loon et al. | |
| 6,341,671 B1 | 1/2002 | Ebersole | |
| 6,352,138 B1 | 3/2002 | Duran et al. | |
| 6,360,851 B1 | 3/2002 | Yang | |
| 6,460,205 B1 | 10/2002 | Lewandowski et al. | |
| 6,532,624 B1 | 3/2003 | Yang | |
| 6,584,641 B1 | 7/2003 | Milbredt | |
| 6,598,712 B1 | 7/2003 | Sun | |
| 6,619,438 B1 | 9/2003 | Yang | |
| 6,662,404 B1 | 12/2003 | Stroh et al. | |
| 6,792,630 B1 | 9/2004 | Palmatier et al. | |
| 6,810,560 B1 | 11/2004 | Tsai | |
| 6,865,775 B2 | 3/2005 | Ganance | |
| 6,951,034 B2 | 10/2005 | Shiery et al. | |
| 7,017,228 B2 | 3/2006 | Silverstein et al. | |
| 7,062,805 B2 | 6/2006 | Hopper et al. | |
| 7,175,004 B2 | 2/2007 | Kassai et al. | |
| 7,182,178 B2 | 2/2007 | Chung | |
| 7,331,428 B2 | 2/2008 | Chiang | |
| 7,537,093 B2 | 5/2009 | Chen | |
| 7,690,059 B2 | 4/2010 | Lemire et al. | |
| 7,708,119 B2 | 5/2010 | Chen | |
| 7,805,784 B2 | 10/2010 | Lemire et al. | |
| 7,926,145 B2 * | 4/2011 | Liao | 16/35 R |
| 8,196,237 B2 | 6/2012 | Herbst et al. | |
| 2002/0069478 A1 | 6/2002 | Trivini | |
| 2003/0019075 A1 | 1/2003 | Trevini | |
| 2004/0099487 A1 | 5/2004 | Melgarejo | |
| 2004/0178025 A1 | 9/2004 | Zweideck | |
| 2006/0151259 A1 | 7/2006 | Tomasi et al. | |
| 2007/0119661 A1 | 5/2007 | Chang | |
| 2009/0085317 A1 | 4/2009 | Livengood et al. | |
| 2010/0007114 A1 | 1/2010 | Papi et al. | |
| 2010/0175222 A1 * | 7/2010 | Fallshaw et al. | 16/35 R |

\* cited by examiner

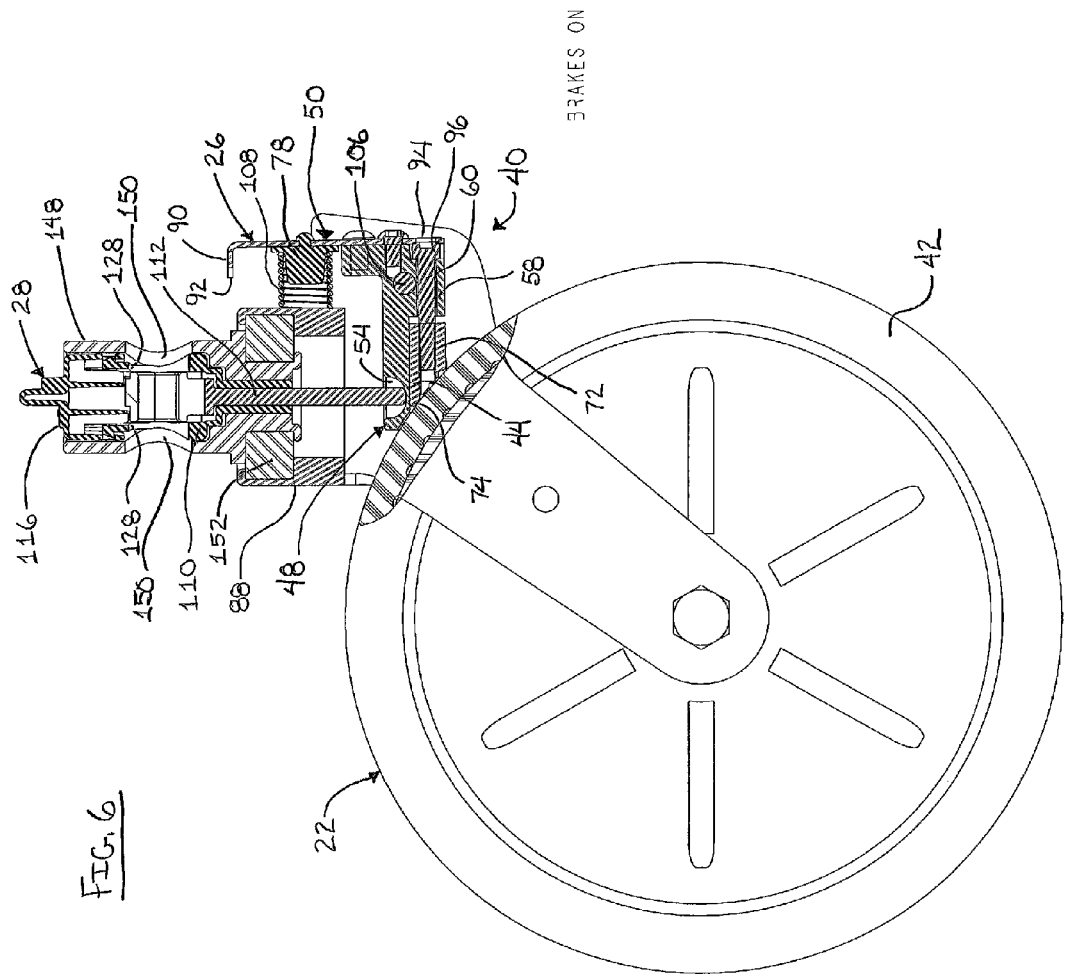

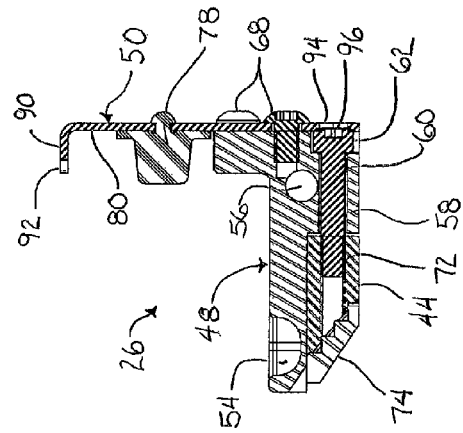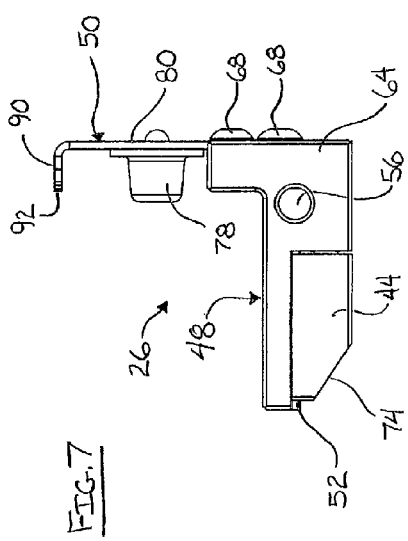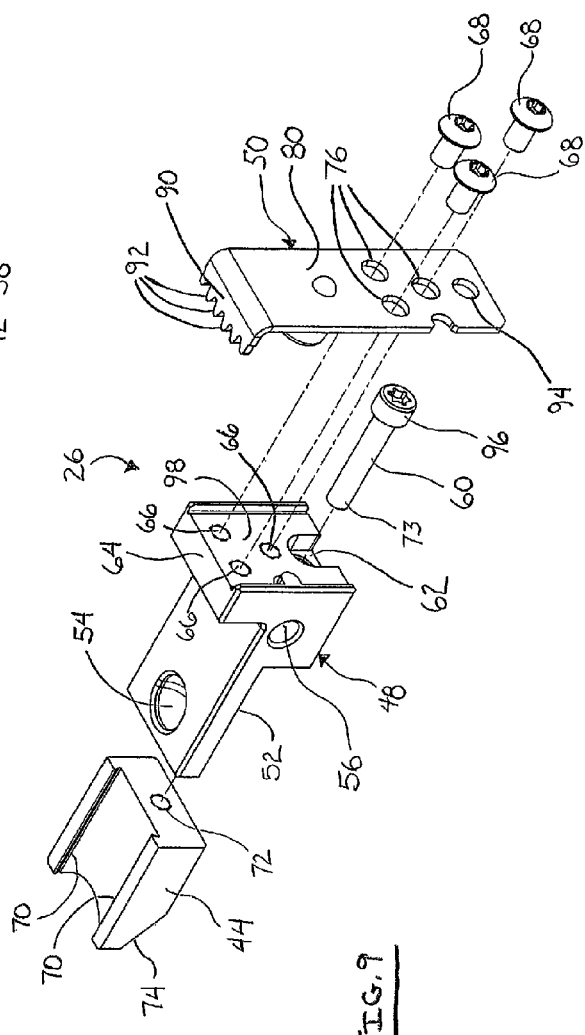

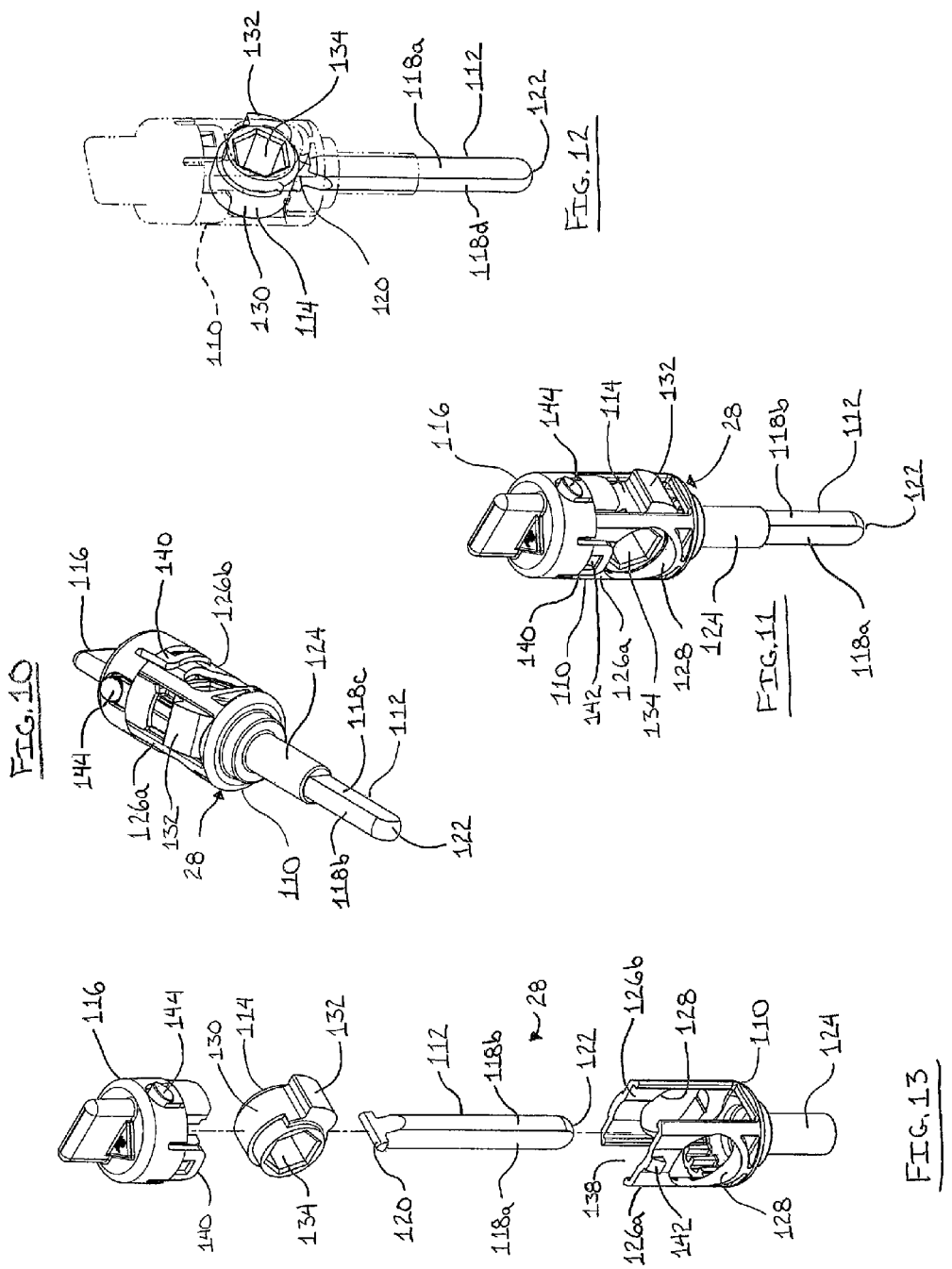

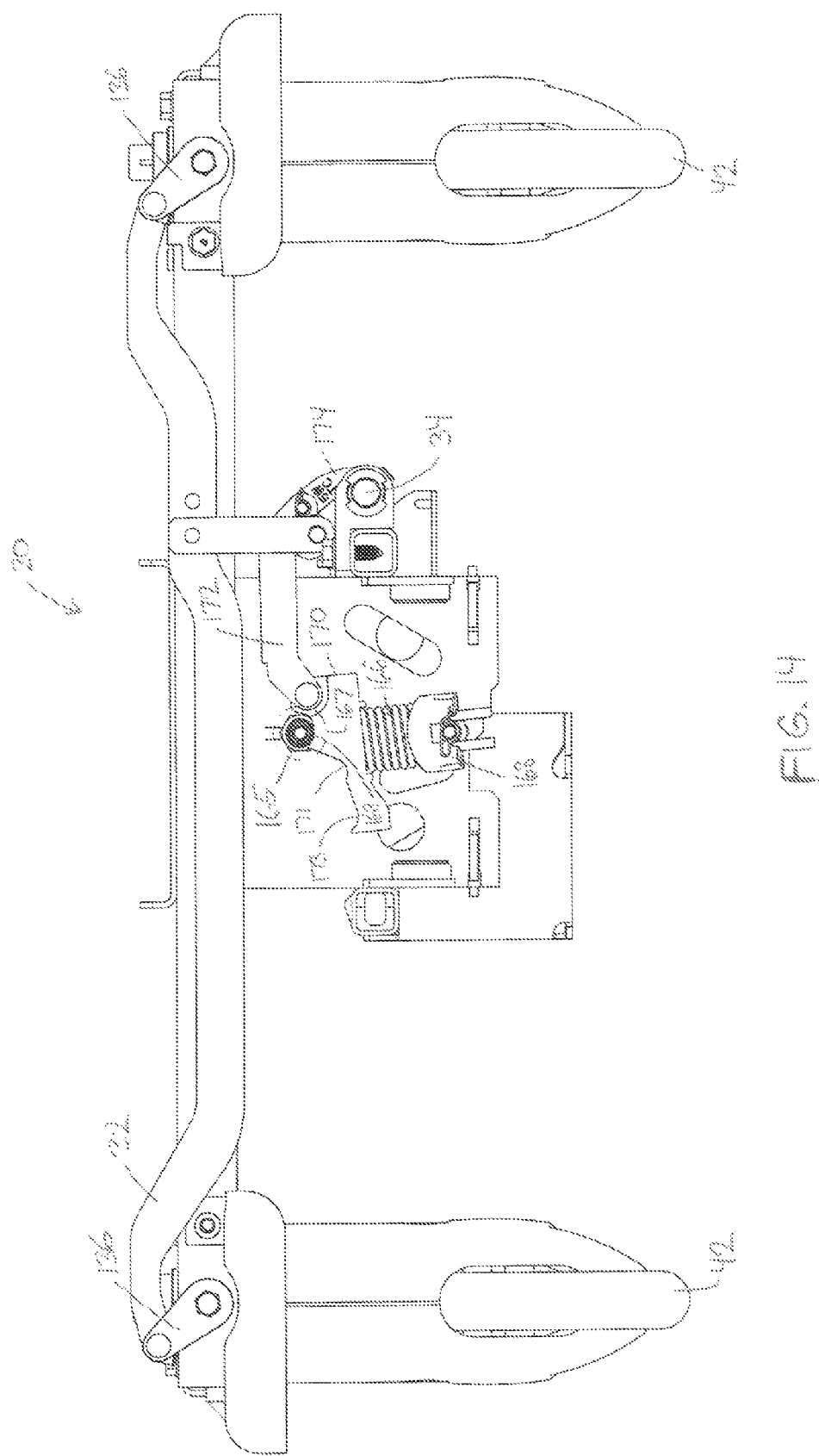

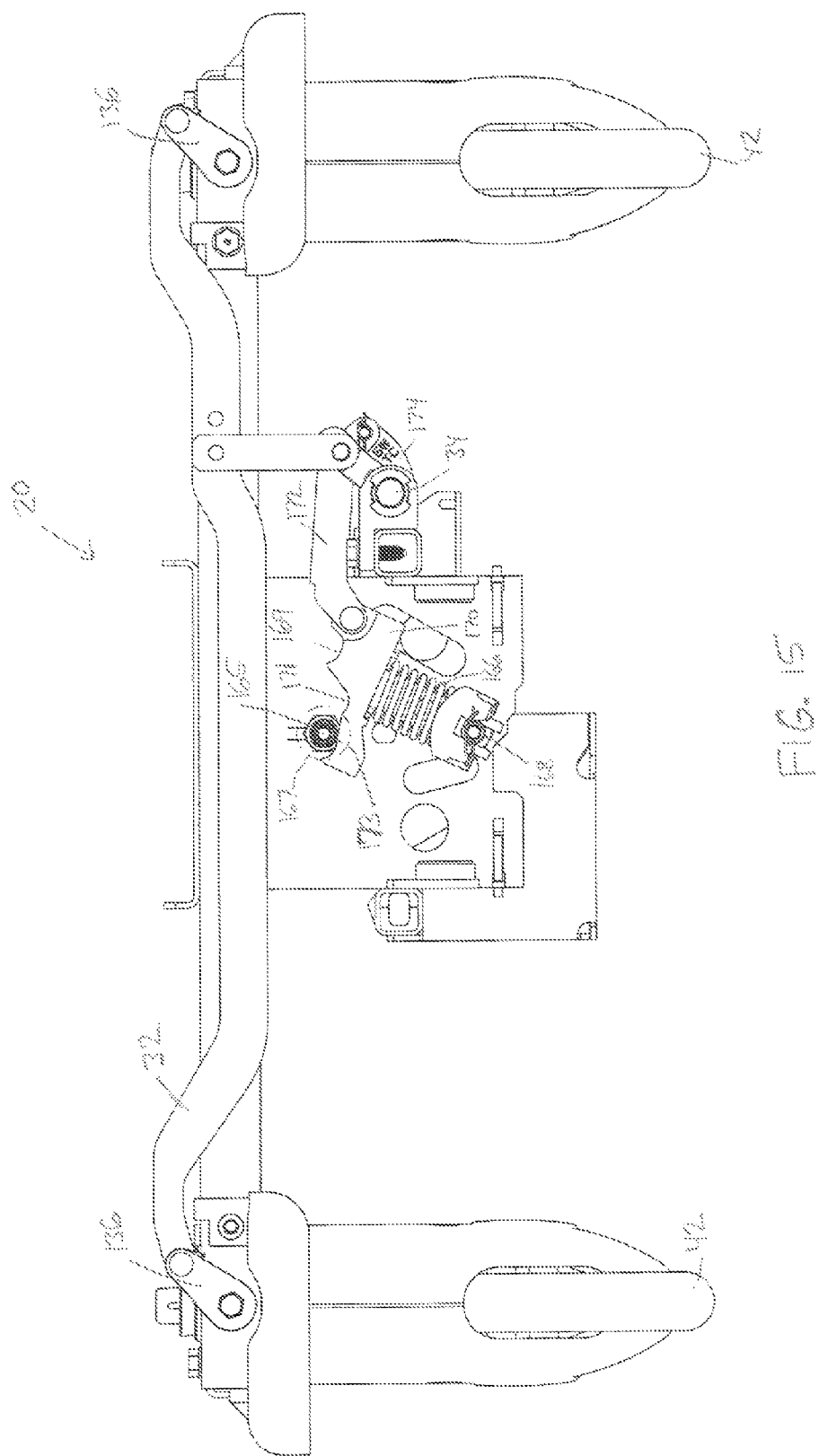

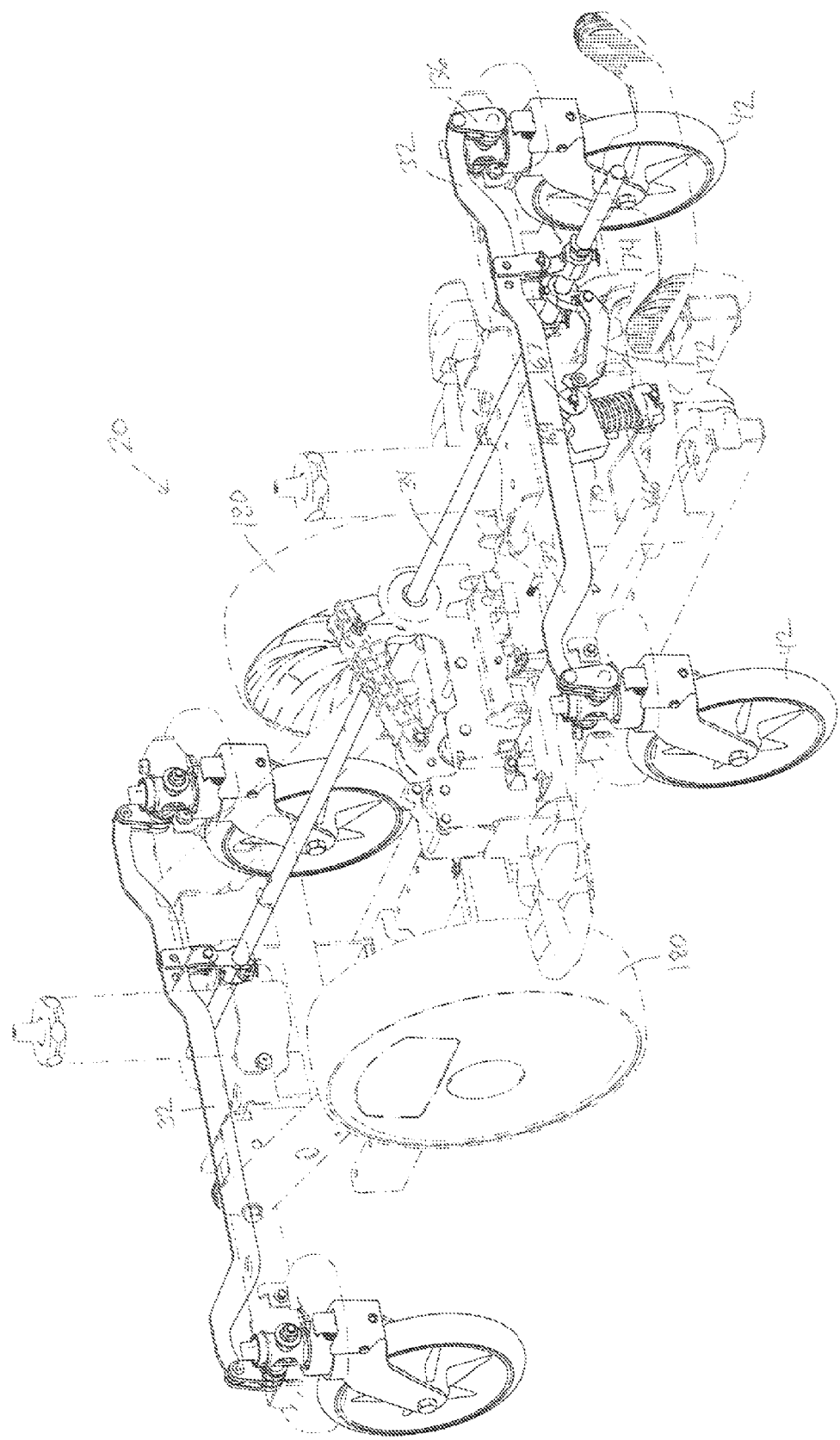

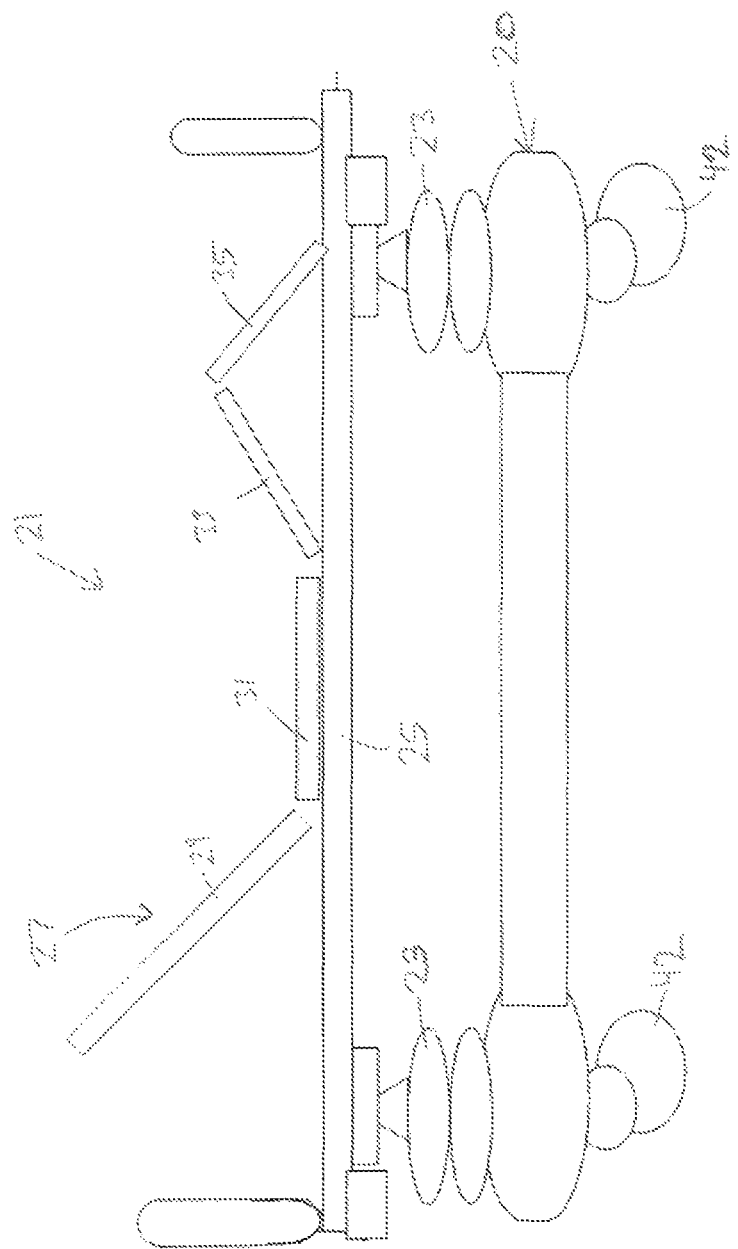

WHEELED CARRIAGE WITH BRAKE LOCK SYSTEM

CROSS-REFERENCE TO RELATED APPLICATIONS

This application claims priority to U.S. provisional patent application Ser. No. 61/557,781 filed Nov. 9, 2011 by applicants William D. Childs et al. and entitled Wheeled Carriage With Brake Lock System, the complete disclosure of which is hereby incorporated herein by reference.

BACKGROUND OF THE INVENTION

The present invention is directed to a wheeled carriage, and in particular to a wheeled carriage with a brake and lock system for selectively inhibiting rotation and swiveling of the carriage wheels.

Medical beds and stretchers include wheels, such as caster wheels, that are provided with structures for allowing the wheels to be selectively placed in either a free wheeling and swiveling mode or a locked mode. Such structures may include separate systems within each of the wheels for preventing swiveling and rotating and may be actuated either locally at a particular wheel or may include a centralized system of links connecting the wheel locking structures together. The structures for preventing swiveling and/or rotating often suffer from either creating too great or too little braking and/or locking forces at a wheel, thereby causing damage to either the wheel or to the structure, or incompletely braking and/or locking the wheel.

SUMMARY OF THE INVENTION

The present invention provides a wheeled carriage with a brake lock system for selectively alternating locking caster wheels of the wheeled carriage between a neutral position in which the wheels may freely rotate and swivel and a locked or engaged position in which the wheels are prevented from rotating and swiveling.

According to one aspect, a patient support apparatus is provided that includes a base, a support deck, a brake pedal, a plurality of brakes that each include a first biasing mechanism, and a second biasing mechanism that is operatively linked to the brake pedal. The base includes a plurality of caster wheels and the support deck is supported on the base. The support deck is adapted to support a patient. The brake pedal is movable between a brake position and a neutral position. The plurality of brakes are movable between a locked position and an unlocked position, and each one of the plurality of brakes is associated with a respective one of the plurality of wheels. Each one of the plurality of brakes also include a first biasing mechanism that urges a respective brake toward the unlocked position. The second biasing mechanism urges the brake pedal either toward the brake position or the neutral position such that the brake pedal is biased against remaining in any intermediate position between the brake position and the neutral position. The plurality of brakes move to the locked position when the brake pedal is in the brake position, and the brakes move to the unlocked position when the brake pedal is in the neutral position.

In other aspects, the plurality of brakes may be configured to prevent both rotation and swiveling of the caster wheels when in said locked position. There may be a total of four wheels and four brakes that selectively brake the four wheels. The brakes may prevent rotation of the wheels by frictionally engaging a surface on the wheels, and the brakes may prevent swiveling of the wheels by moving a component into a blocking position that blocks swiveling movement of the wheels. The component may be a toothed structure and the blocking position may be a position in which the toothed structure engages a toothed gear that would otherwise rotate when a wheel associated with the toothed gear swivels.

In still other aspects, the brake pedal may be located at a first end of the patient support apparatus, and the patient support apparatus may include a second brake pedal located at a second end of the patient support apparatus. The second brake pedal will be operatively coupled to the brake pedal such that both brake pedals move in tandem with each other between the neutral position and the brake position. The biasing first and second biasing mechanisms may both be springs. The biasing mechanism for the brakes may urge a lock assembly about a pivot axis. The lock assembly may include teeth on a first end thereof that are adapted to selectively engage a gear and to prevent swiveling of the respective wheel when engaged therewith. The lock assembly may also include a frictional brake on a second end thereof that is adapted to selectively engage a surface of the respective wheel.

The patient support apparatus may also include a drive shaft connected to the brake pedal wherein the drive shaft has a first orientation corresponding to the brake pedal neutral position and a second orientation corresponding to the brake pedal brake position. The second biasing mechanism may include a single spring that exerts a rotational biasing force on the drive shaft urging the drive shaft away from any intermediate orientation between the first and second orientations.

According to another aspect of the present invention, a wheeled carriage for supporting a patient comprises a wheeled base and a braking system, with the wheeled base having frame members and supporting a plurality of caster wheel assemblies, each of which includes a wheel. The braking system includes a moveable brake lock assembly, a brake lock actuator, and a swivel lock receiver operatively connected to one of the caster wheel assemblies to define a locking caster wheel assembly. The brake lock assembly comprises an actuating member, a swivel lock member, and a brake member that are interconnected as a unit for simultaneous movement. The brake lock actuator is operable to selectively move the brake lock assembly into an engaged position via engagement with the actuating member, with the swivel lock member engaging the swivel lock receiver and the brake member contacting the wheel of the locking caster wheel assembly thereby preventing rotation and swiveling of the wheel when the brake member is in the engaged position.

In other embodiments the actuating member may comprise an actuating plate and the swivel lock member may comprise a swivel lock plate, with the swivel lock plate being joined to the actuating plate, and the brake member being joined to the actuating plate. In any of the embodiments the brake lock assembly may include an adjusting bolt connecting the brake member to the actuating member or plate and enabling adjustment of the position of the brake member relative thereto. The swivel lock plate can at least partially cover the bolt head to retain the adjusting bolt and prevent axial movement of the adjusting bolt relative to the actuating plate. The swivel lock plate can include an access aperture aligned with the bolt head, enabling access to the adjustment bolt whereby to adjust the position of the brake member relative to the adjusting plate. In any of the embodiments the swivel lock member or plate may include at least one projecting member for engagement with the swivel lock receiver. Still further, the swivel lock receiver may comprise a circumferential lock gear and the swivel lock member or plate may include a rack member having multiple projecting members for selective engagement with the lock gear.

In any of the aforementioned embodiments, the locking caster wheel assembly may include a caster leg body having a pair of spaced members between which the brake lock assembly is received. Each spaced member may include a mounting aperture aligning with a mounting passage on the brake lock assembly with the brake lock assembly being secured to the caster leg body by a mounting pin such that the brake lock assembly is able to pivot on the mounting pin relative to the caster leg body. A biasing member may be included for acting on the brake lock assembly to pivot the brake lock assembly into a disengaged position in which the wheel of the locking caster wheel assembly is able to swivel and rotate.

In any of the aforementioned embodiments, the brake lock assembly may be affixed to swivel with the wheel of the locking caster wheel assembly and the brake lock actuator being fixed relative to swiveling rotation of the wheel. The brake lock actuator can include a rotatable cam and a plunger, with rotation of the cam causing extension of the plunger to move the brake lock assembly into the engaged position. The brake lock actuator may include a cam housing with the plunger extending through the cam housing and the cam housing including a plunger guide configured to prevent rotation of the plunger. The plunger may include a cam follower, which may be formed as an elongate and radiused edge, and the plunger may engage a detent on the actuating member.

In any of the aforementioned embodiments, the brake lock actuator may include a rotatable cam and a plunger, with rotation of the cam causing extension of the plunger to move the brake lock assembly into the engaged position. The cam may include a drive aperture for receiving a cam drive member. The wheeled carriage may include a foot pedal for driving the cam drive member, and may also include a drive link connected to the cam drive member with a foot pedal operatively connected to the drive link. Still further, the wheeled carriage may include a drive shaft and a shaft biasing assembly with the shaft biasing assembly, a foot pedal, and a drive link connected to the drive shaft, and with the shaft biasing assembly imparting a rotational biasing force on the drive shaft urging the brake lock assembly into the engaged position.

The wheeled carriage in any of the aforementioned embodiments may include a plurality of moveable brake lock assemblies, each being operatively connected to a separate caster wheel assembly to define a plurality of locking caster wheel assemblies.

According to another aspect of the present invention, a wheeled carriage for supporting a patient comprises a wheeled base having frame members and supporting a plurality of caster wheel assemblies each including a wheel, with two caster wheel assemblies comprising a first pair of locking caster wheel assemblies. Each locking caster wheel assembly includes a moveable brake lock assembly, a brake lock actuator, and a swivel lock receiver, with the brake lock assembly comprising an actuating member, a swivel lock member, and a brake member that are interconnected as a unit for simultaneous movement. The brake lock actuator is operable to selectively move the brake lock assembly into an engaged position via engagement with the actuating member, with the swivel lock member engaging the swivel lock receiver and the brake member contacting the wheel of the locking caster wheel assembly thereby preventing rotation and swiveling of the wheel of the locking caster wheel assembly when the brake member is in the engaged position. The wheeled carriage further includes a drive link operatively interconnecting the brake lock actuators of the first pair of locking caster wheel assemblies, with the drive link being operable to simultaneously actuate both brake lock actuators whereby both brake lock assemblies are moved to the engaged position.

In particular embodiments each brake lock actuator may include a rotatable cam with each locking caster wheel assembly further including a cam drive member connected to the cam, with the drive link being connected to the cam drive members of each of the first pair of locking caster wheel assemblies. A foot pedal and/or a primary biasing system may be operatively connected to the drive link in any of the aforementioned embodiments, with the primary biasing system imparting a biasing force to the drive link urging the brake lock assemblies of the first pair of locking caster wheels into the engaged position, where selective depression of the foot pedal selectively places the brake lock assemblies into either the engaged position or a disengaged position in which the wheels of the first pair of locking caster wheels are able to swivel and rotate. Each brake lock assembly may further include a secondary biasing member urging the respective brake lock assembly into the disengaged position.

In any of the aforementioned embodiments, the wheeled carriage may further include a drive shaft and an additional drive link, with an additional two of caster wheel assemblies comprising a second pair of locking caster wheel assemblies. The additional drive link operatively interconnecting the brake lock actuators of the second pair of locking caster wheel assemblies. A foot pedal may be connected to the drive shaft with both drive links operatively connected to the drive shaft and a primary biasing system connected to the drive shaft to impart a biasing force to both drive links via the drive shaft.

The primary biasing system in any of the aforementioned embodiments may include a primary biasing member and a biasing linkage, the biasing linkage being connected to the drive shaft and the primary biasing member acting on the biasing linkage to impart a rotational biasing force on the drive shaft.

In any of the aforementioned embodiments, each actuating member may comprise an actuating plate and each swivel lock member may comprise a swivel lock plate, with the swivel lock plate joined to the actuating plate and the brake member joined to the actuating plate. Each brake lock assembly may further include an adjusting bolt connecting the brake member to the actuating plate and enabling adjustment of the position of the brake member relative to the adjusting plate. Each swivel lock plate may at least partially cover the adjusting bolt head to retain the adjusting bolt and prevent axial movement of the bolt relative to the actuating plate. Each swivel lock plate may include an access aperture aligned with the bolt head to enable the adjustment bolt to be rotated to adjust the position of the brake member relative to the adjusting plate.

Each swivel lock plate in any of the aforementioned embodiments may include at least one projecting member that is selectively engaged with a respective swivel lock receiver. Each swivel lock receiver may comprise a circumferential lock gear and each swivel lock plate may include a rack member having a plurality of projecting members for selective engagement with the respective lock gear.

Each locking caster wheel assembly in any of the aforementioned embodiments may include a caster leg body having a pair of spaced members between which the brake lock assembly is received, with each spaced member including a mounting aperture and each brake lock assembly including a mounting passage with the mounting passage of each brake lock assembly being aligned with respective mounting apertures when the brake lock assembly is received between the spaced members. Each brake lock assembly may be secured to a respective caster leg body by a mounting pin with to enable pivoting movement relative to the caster leg body. Each brake lock assembly may be affixed to a respective locking caster wheel assembly to swivel with the wheel of the locking caster wheel assembly with each brake lock actuator being fixed relative to swiveling rotation of the wheel, and each brake lock actuator may include a plunger with rotation of the cam causing extension of the plunger to move the brake lock assembly into the engaged position. Each brake lock actuator may further include a cam housing with the plunger extending through the cam housing and the cam housing including a plunger guide configured to prevent rotation of the plunger relative to the cam housing. The plungers of the brake lock actuators can include a cam follower comprising an elongate and radiused edge member that contacts the cam, and may engage a detent on the actuating member.

The wheeled carriage of the present invention may include any manner of patient support structures with the braking system of the wheeled base enabling the caster wheels to be precisely and simultaneously locked against rotation and swiveling. The integrated or interconnected components of the brake lock assembly provide a single, adjustable component that may be selectively engaged for simultaneous prevention of both rolling and swiveling of a caster wheel, with the brake member being readily and easily adjusted via convenient access to the adjusting bolt through the swivel lock plate without the need to disassemble components to access the bolt and/or release the bolt for adjustment. The brake lock assembly and brake lock actuator may be readily removed as necessary, such as for replacement of the brake member. Accurate synchronization of the locking caster wheel assemblies via the interlinked braking system construction enables the interlinked locking caster wheels to be fully locked and unlocked together.

These and other objects, advantages, purposes and features of this invention will become apparent upon review of the following specification in conjunction with the drawings.

BRIEF DESCRIPTION OF THE DRAWINGS

FIG. 6 is a partial cross sectional side elevation view of the caster wheel of FIG. 4 with the brake lock assembly shown in an engaged position and shown without the swivel lock receiver;

FIG. 7 is a side elevation view of a brake lock assembly in accordance with the present invention shown removed from a locking caster wheel;

FIG. 8 is a cross sectional side elevation view of the brake lock assembly of FIG. 7;

FIG. 9 is an exploded perspective view of the brake lock assembly of FIG. 7;

FIG. 10 is bottom end perspective view of a brake lock actuator in accordance with the present invention;

FIG. 11 is a top end perspective view of the brake lock actuator of FIG. 10;

FIG. 12 is a top end perspective view of the brake lock actuator of FIG. 10 with the cam housing and cam top shown with hidden lines for clarity;

FIG. 13 is an exploded perspective view of the brake lock actuator of FIG. 10;

FIG. 14 is an end, elevational view of the carriage assembly shown with a drive shaft rotated to a braked orientation;

FIG. 15 is an end, elevational view of the carriage assembly shown with the drive shaft rotated to a steer orientation;

FIG. 16 is a side perspective view of the wheeled carriage and braking system shown from an opposite end of that of FIG. 1, illustrating the brakes in a neutral position; and FIG. 17 is a side, elevational diagram of an illustrative patient support apparatus that may incorporate the wheeled carriage.

DETAILED DESCRIPTION OF THE EMBODIMENTS

Figure 1:
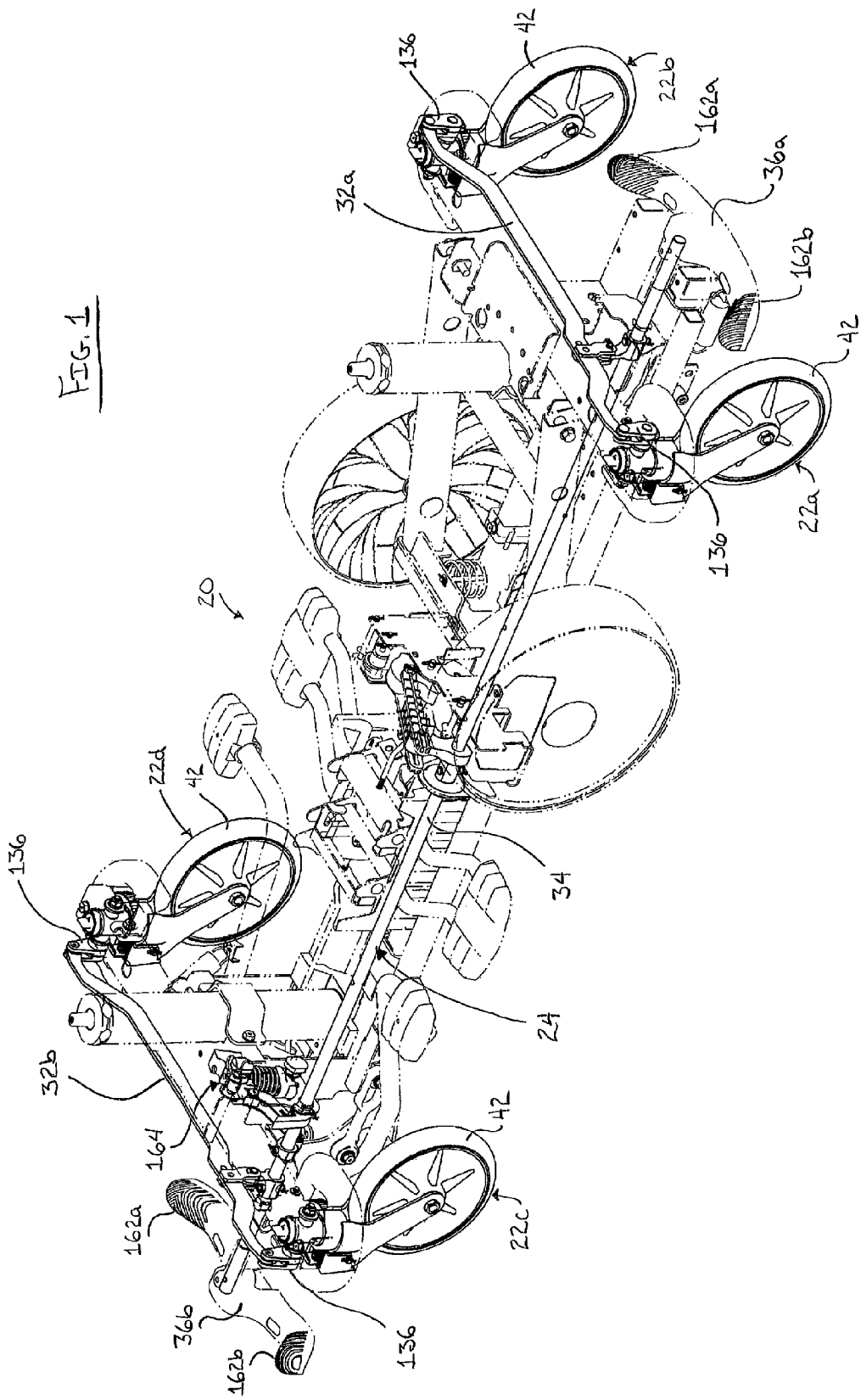
FIG. 1 is a side perspective view of a wheeled carriage and braking system in accordance with the present invention.

The present invention will now be described with reference to the accompanying figures, wherein the numbered elements in the following written description correspond to like-numbered elements in the figures. With initial reference to FIGS. 1 to 4, the wheeled carriage of the present invention includes a wheeled base 20 intended for use with a patient support for carrying a patient, and includes four interlinked caster wheel assemblies, each of which in the illustrated embodiment is a locking caster wheel assembly 22a, 22b, 22c, 22d. The wheeled base 20 may be used with any type of patient support, such as, but not limited to, a stretcher, a cot, a bed, a mobile operating table, or any other type of mobile patient-carrying structure having a surface on which a patient may be supported, in a seated position, a prone position, a supine position, or combinations and/or variations thereof. FIG. 16 illustrates in diagram of one example of a patient support apparatus 21 that may incorporate the wheeled base 20 described herein. Other types of patient support apparatuses may also incorporate the wheeled base 20.

As shown in FIG. 16, patient support apparatus 21 includes, in addition to base 20, a pair of elevation adjustment mechanisms 23 that are coupled to a frame 25. A support deck 27 is supported on the frame 25 and includes a plurality of sections. In one embodiment, deck 27 includes a head or Fowler section 29, a seat section 31, a thigh section 33, and a leg section 35. Actuators may be coupled to one or more of these sections to allow them to pivot in a manner that is selectable by a user of the patient support apparatus 21, or by a caregiver. A mattress (not shown), or other cushioned surface, may be placed on top of support deck 27 to provide cushioning to the patient resting thereon. The elevation adjustment mechanisms 23 are adapted to raise and lower the frame 25 relative to the base. Elevation adjustment mechanisms 23 may be hydraulic jacks that are either electrically or manually controlled, or both; or they may be electrical actuators, or any other mechanical structure capable of raising and lowering frame 25 with respect to base 20.

Figure 2:
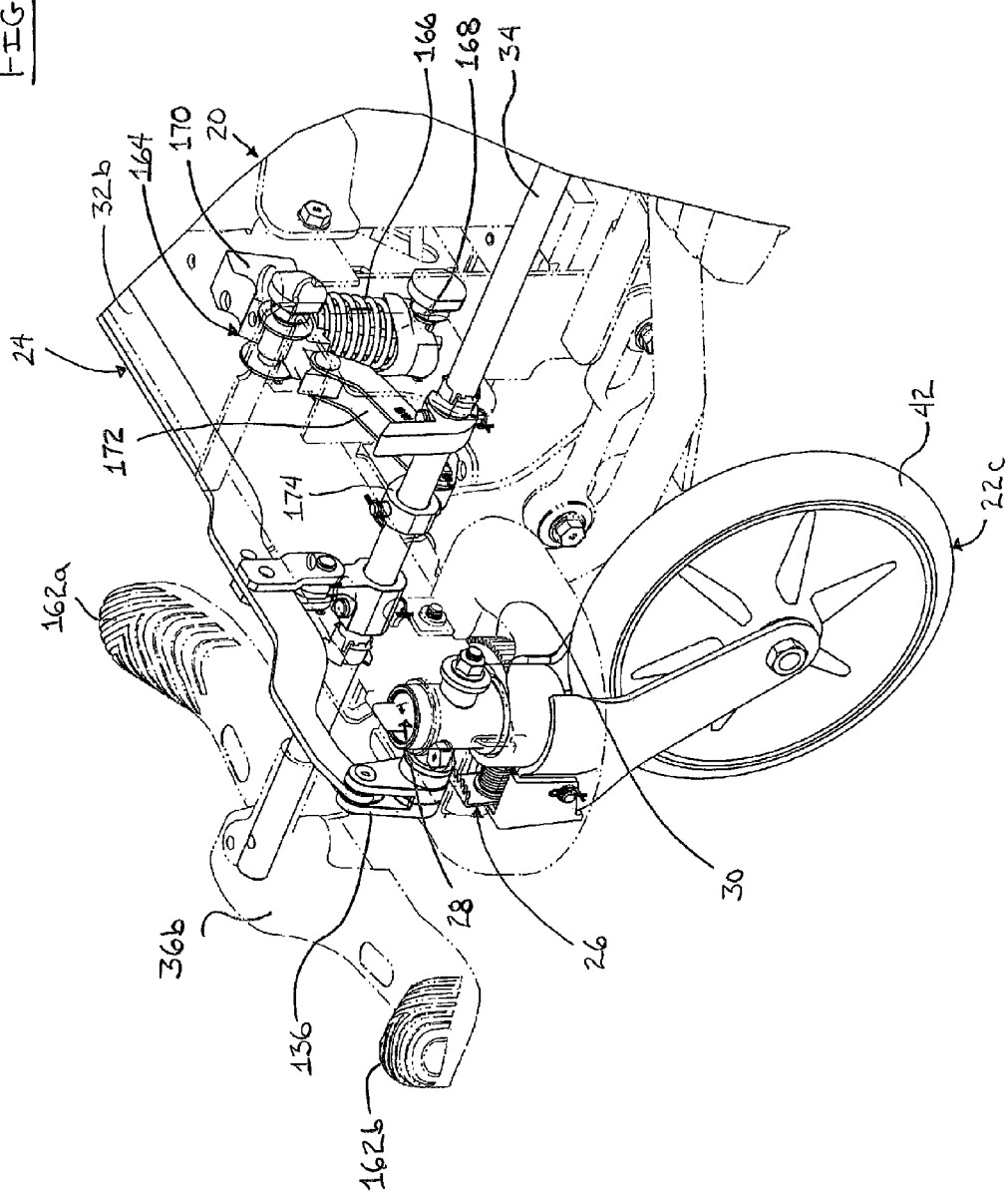
FIG. 2 is a close up partial perspective view of one corner of the wheeled carriage of FIG. 1.
Figure 3:
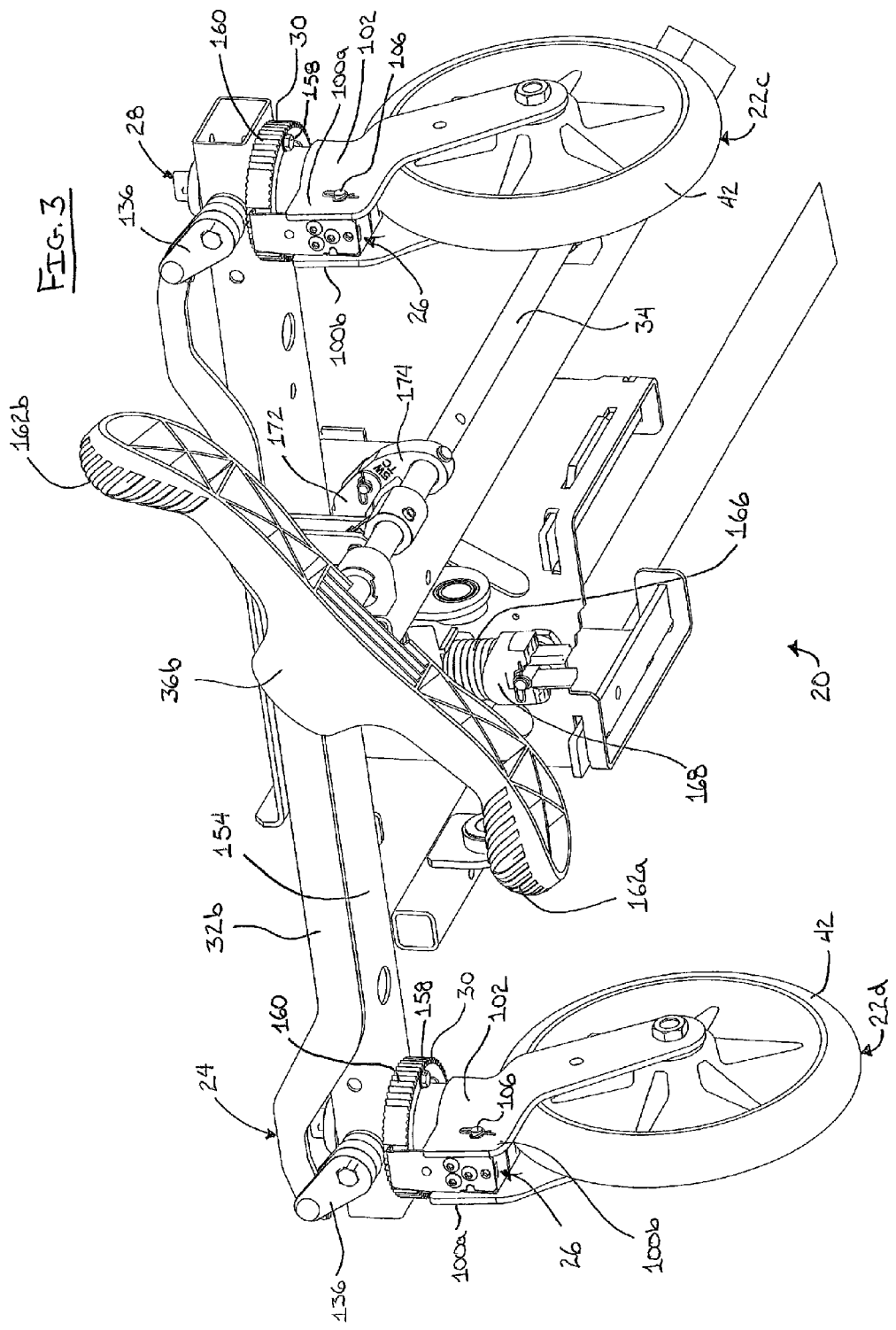
FIG. 3 is a partial front end perspective view of the wheeled carriage of FIG. 1 shown with a brake pedal in a braked orientation.
Figure 4:
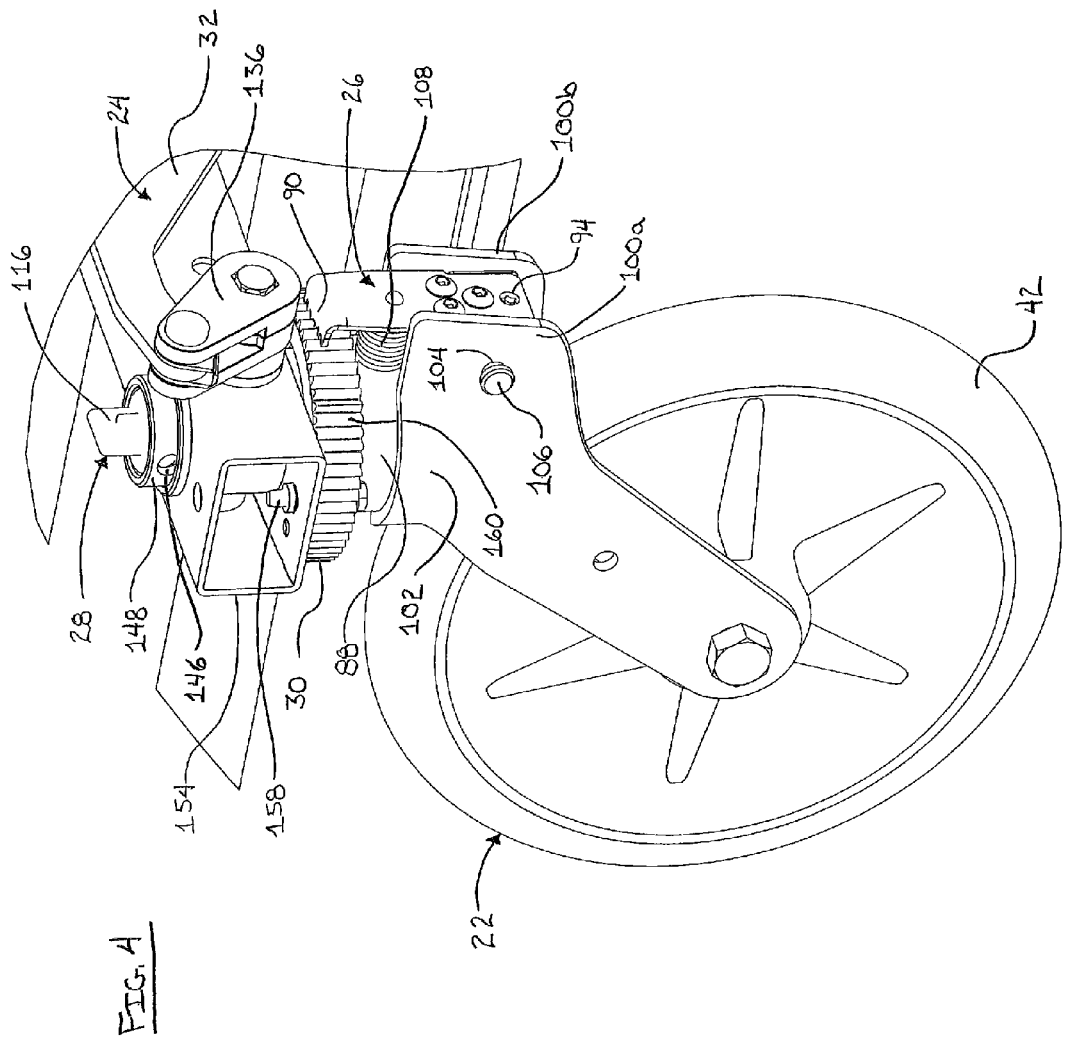
FIG. 4 is a side perspective view of a locking caster wheel in accordance with the present invention.

Base 20 is adapted to allow patient support apparatus 21 to be transported to different locations via wheels 42. The base is further adapted to allow the wheels to be locked so that they neither rotate nor swivel. The locking caster wheel assemblies 22 associated with each wheel are interlinked by a braking system 24, as shown in FIGS. 2-4 and described in detail below. Each locking caster wheel assembly 22 includes an integrated and moveable brake lock assembly 26, a brake lock actuator 28 for actuating the brake lock assembly 26, and a swivel lock receiver 30 that receives an element of the brake lock assembly 26. Actuation of brake lock assemblies 26 simultaneously prevents locking caster wheels 22 from rotating and swiveling.

In the illustrated embodiment, the locking caster wheel assemblies 22 are interlinked by a pair of drive links 32a, 32b and a drive shaft 34, with each drive link 32 connected to a pair of opposed locking caster wheel assemblies 22 and the drive links 32 in turn connected to the drive shaft 34. Foot pedals 36a, 36b are mounted to either end of drive shaft 34 whereby depression of a foot pedal 36 by a user imparts motion to the drive links 32. The drive links 32 are operatively connected to the brake lock actuators 28 such that motion of drive links 32 drives the brake lock actuators 28 to engage the brake lock assemblies 26. Each brake lock assembly 26 is thereby positionable between a neutral or disengaged position 38 (FIG. 5) and an engaged position 40 (FIG. 6) via action of the brake lock actuator 28. Actuation by the brake lock actuator 28 causes the brake lock assembly 26 to simultaneously engage the wheel 42 and swivel lock receiver 30 (not shown in FIG. 6) of a locking caster wheel assembly 22 thereby preventing the wheel 42 from rotating and swiveling when in the engaged position 40, with the wheel 42 being able to freely rotate and swivel when in the disengaged position 38.

Referring now to FIGS. 4 to 9, each of the moveable brake lock assemblies 26 comprise an integrated component that includes a brake member 44, an actuating member, and a swivel lock member, with the actuating member and swivel lock member in the illustrated embodiment comprising an actuating plate 48 and a swivel lock plate 50, respectively. As shown, the brake member 44, actuating plate 48 and swivel lock plate 50 are interconnected as a unit such that the various structures of the brake lock assembly 26 move in unison.

With particular reference to FIGS. 7 to 9, actuating plate 48 includes a brake member receptacle 52, a hemispherical detent 54, a mounting passage 56, and an adjusting bolt passage 58 through which adjusting bolt 60 is passed. An adjusting bolt head cavity 62 is located at end 64 of actuating plate 48 to which swivel lock plate 50 is affixed, with end 64 further including mounting holes 66 for receiving fasteners 68 for the attachment of swivel lock plate 50. Brake member 44 includes channels 70 for sliding connection to actuating plate 48 at receptacle 52 and includes threaded adjusting bolt hole 72 for receiving a threaded end 73 of adjusting bolt 60. Brake member 44 further includes angled brake surface 74 that is selectively engaged and disengaged from wheel 42. Swivel lock plate 50 includes apertures 76 through which fasteners 68 are passed to affix swivel lock plate 50 to actuating plate 48 and a spring retainer 78 on body portion 80. Swivel lock plate 50 further includes a rack member 90 having multiple projecting members or teeth 92, with rack member 90 being disposed at an approximate right angle relative to body portion 80 and directed toward brake member 44.

Swivel lock plate 50 further includes an access aperture 94 enabling an adjustment tool to access the head 96 of adjusting bolt 60 when located within cavity 62 and covered by swivel lock plate 50. Thus, when swivel lock plate 50 is mounted to end 64 of actuating plate 48, swivel lock plate 50 retains bolt 60 within passage 58 while still enabling adjusting bolt 60 to be turned. As understood from FIG. 8, rotation of bolt 60 will thereby extend and retract brake member 44 along receptacle 52 without bolt 60 axially moving relative to actuating plate 48. Bolt head 96 and cavity 62 may also be sized such that head 96 extends slightly beyond the mounting surface 98 of end 64 whereby swivel lock plate 50 applies pressure against bolt head 96 to provide further retention of bolt 60 and further inhibit unintended rotation of bolt 60. Brake member 44 may thus be readily adjusted with bolt 60 being retained in a self-locking manner.

Figure 5:
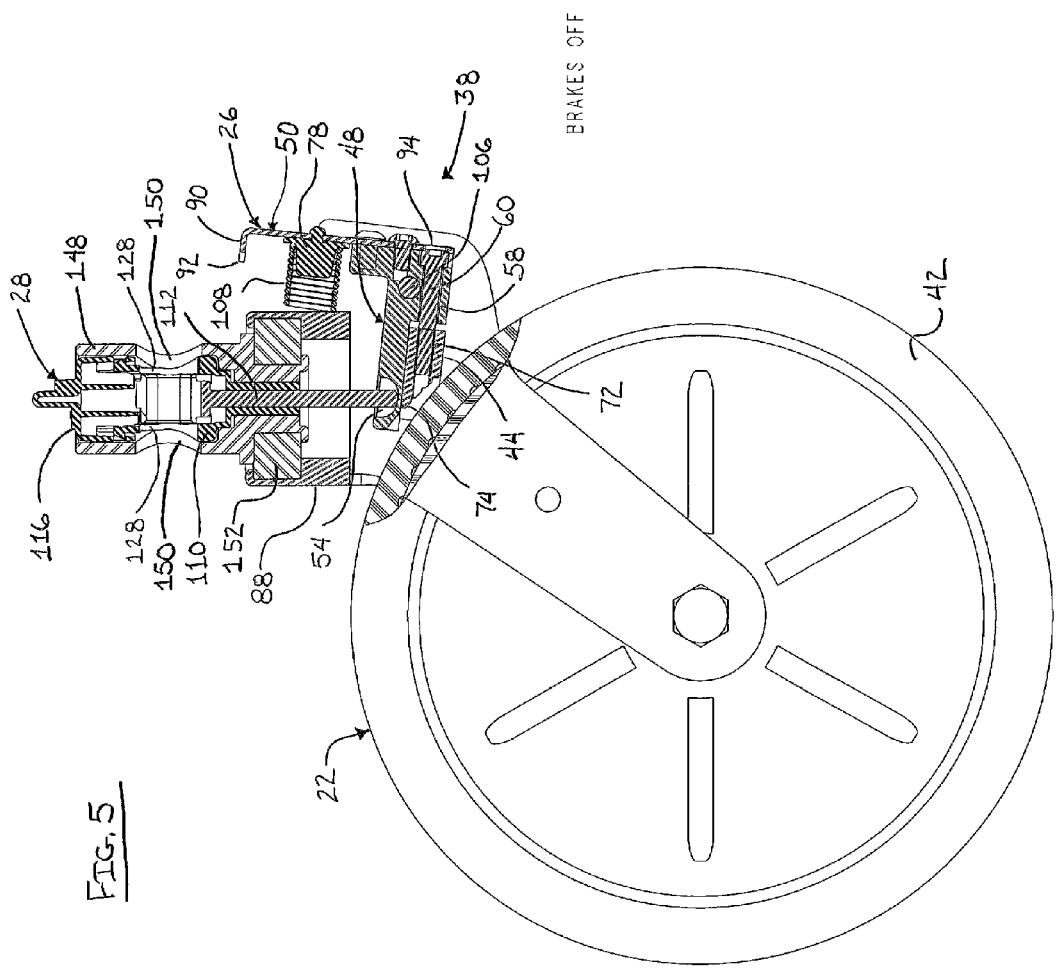
FIG. 5 is a partial cross sectional side elevation view of the caster wheel of FIG. 4 with the brake lock assembly shown in a disengaged position and shown without the swivel lock receiver.

Referring now to FIGS. 4 to 6, brake lock assembly 26 is mounted between a pair of spaced members 100a, 100b on caster leg body 102. Each spaced member 100 includes a mounting aperture 104 (one shown in FIG. 4) that align with the mounting passage 56 of brake lock assembly 26 when brake lock assembly 26 is positioned between the spaced members 100. A mounting shaft or pin 106 inserted through the mounting apertures 104 and mounting passage 56 is used to retain the brake lock assembly 26 in place, with the brake lock assembly 26 thus being able to pivot on mounting pin 106. A biasing member, which in the illustrated embodiment comprises a spring 108, is positioned between caster shaft 88 and swivel lock plate 50, with spring 108 being seated on spring retainer 78. Spring 108 provides a biasing force to swivel lock plate 50 urging brake lock assembly 26 into the disengaged position 38 of FIG. 5. As described in more detail below, spring 108 comprises a secondary biasing member acting against a primary biasing member urging brake lock assembly 26 into the engaged position 40 of FIG. 6.

Referring now to FIGS. 4, 5 and 10 to 13 for the construction and operation of brake lock actuator 28, brake lock actuator 28 is shown to include a cam housing 110, plunger 112, cam 114, and housing cap or top 116, with plunger 112 and cam 114 being retained within cam housing 110. Plunger 112 includes four sides 118a, 118b, 118c, 118d, a cam follower 120, and a rounded end 122 opposite cam follower 120. Cam housing 110 includes a plunger guide 124 within which plunger 112 is extended and retracted, with plunger guide 124 conforming to the sides 118 of plunger 112 such that plunger 112 is prevented from rotating relative to cam housing 110. Cam housing 110 further includes a pair of upright spaced body members 126a, 126b, each of which includes a drive opening 128, with drive openings 128 being axially aligned relative to each other.

Cam 114 is positioned within cam housing 110 above plunger 112 and includes a cam surface 130 and a cam lobe 132. Cam follower 120 is formed as an elongate radiused edge that extends laterally across substantially the entire width of cam surface 130 thereby increasing the contact surface between the cam follower 120 and cam 114 and reducing wear relative to point contact constructions. Moreover, because the plunger 112 is retained from rotation, the orientation and contact is more accurately maintained. In the illustrated embodiment cam 114 further includes a drive aperture 134 formed as a hexagonal through hole. As understood from FIG. 11, drive aperture 134 aligns with drive openings 128 when cam 114 is installed within cam housing 110 such that a cam drive member 136 (FIG. 4) may be mounted into drive aperture 134 for imparting rotation to cam 114. Cam lobe 132 is able to rotate between the gap 138 between spaced body members 126a, 12b of cam housing 110.

Housing cap 116 includes a pair of opposed ears or tabs 140 that engage with respective opposed outwardly extending protuberances 142 (one shown in FIGS. 10 to 12) on each of the body members 126a, 126b for securing cap 116 to cam housing 110. Cap 116 further includes a pair of opposed locking tabs 144 (one shown in FIGS. 10 to 12) that are offset 90 degrees from tabs 140. Locking tabs 144 engage opposed locking apertures 146 (one shown in FIG. 4) of an actuator housing 148 (FIGS. 4 to 6) for retaining brake lock actuator 28 within actuator housing 148.

With reference to FIGS. 5 and 6, actuator housing 148 includes a pair of opposed and aligned housing apertures 150, with actuator housing 148 being attached to caster shaft 88 via a bearing 152 affixed to the lower end of actuator housing 148. As shown in FIG. 4, actuator housing 148 is mounted to frame member 154 of wheeled base 20, with brake lock actuator 28 being mounted within actuator housing 148. When so mounted, drive aperture 134 of cam 114 aligns with housing apertures 150, as shown in FIGS. 5 and 6, whereby cam drive member 136 is mounted through frame member 154 and into drive aperture 134 of cam 114 with actuator housing 148 and brake lock actuator 28 being fixed relative to frame member 154. Caster shaft 88 is able to rotate relative to actuator housing 148, brake lock actuator 28, and frame member 154 via bearing 152, with caster leg body 102 being affixed to caster shaft 88 such that brake lock assembly 26 is in turn able to rotate relative to actuator housing 148 and brake lock actuator 28. The rotation provided by bearing 152 thus enabling wheel 42 to swivel when brake lock assembly 26 is in the disengaged position 38 of FIG. 5.

Brake lock actuator 28 is actuated by cam drive member 136 via cam drive member 136 causing cam 114 to rotate, which in turn causes cam lobe 132 to contact follower 120 and impart downward extension of plunger 112 that is in contact with actuating plate 48 at detent 54. Downward extension of plunger 112 overcomes the biasing force imparted by spring 108 and causes brake lock assembly 26 to pivot about mounting pin 106 with brake member 44 engaging wheel 42 and teeth 92 of rack member 70 of swivel lock plate 50 engaging swivel lock receiver 30.

In the illustrated embodiment, swivel lock receiver 30 comprises a toothed gear that is fixedly mounted to frame member 154 via fasteners 158 and includes circumferentially disposed gear teeth 160 (FIGS. 5 and 6). Teeth 92 of swivel lock plate 50 align with gear teeth 160 when brake lock assembly 126 is mounted to caster leg body 102. In the disengaged position 38, swivel lock plate 50 is able to rotate about swivel lock receiver 30 due to brake lock assembly 26 being mounted to caster leg body 102. Selective activation of brake lock actuator 28 causes locking engagement of teeth 92 with gear teeth 160 to prevent swiveling of wheel 42 when in the engaged position 40.

With reference to FIGS. 1 to 3 of the illustrated embodiment, simultaneous selective placement of all locking caster wheel assemblies 22 into either of the engaged position 40 or disengaged position 38 is achieved via depression of a foot pedal 36a or 36b, each of which includes opposed foot pads 162a, 162b. Depression of a foot pedal 36 imparts rotation to shaft 34 with interlinked braking system 24 further including a primary or shaft biasing assembly 164 operating on shaft 34. Primary shaft biasing assembly 164 includes a primary biasing member, which in the illustrated embodiment comprises a coil spring 166, mounted between a pivoting base 168 and a biasing pivot member 170. Primary shaft biasing assembly 164 further includes a biasing linkage 172 and a biasing cam 174, with biasing linkage 172 connected between pivot member 170 and biasing cam 174, and with biasing cam 174 affixed to shaft 34. Primary shaft biasing assembly 164 operates to impart a rotational biasing force to shaft 34 tending to urge brake lock assemblies 26 into either the fully engaged position 40, or the fully neutral or disengaged position 38.

As can be more clearly seen in FIGS. 14-16, shaft biasing assembly 164 includes a stationary bar 165 on which may be positioned a roller 167 for rolling engagement with a top surface of biasing pivot member 170. Roller 167 will rollingly engage different sections of the top surface of biasing pivot member 170, depending upon whether the brake pedal has been rotated to the brake position of the neutral position, or, as will be discussed further below, rotated to a steer position in which the brakes are disengaged and a fifth wheel, or a pair of fifth wheels that are non-castered, are lowered into contact with the ground to assist in steering patient support apparatus 21. Roller 167 will engage different sections of the top surface of biasing pivot member 170 due to the pivoting movement of pivot member 170, which pivots in accordance with the pivoting of foot or brake pedal 36. More specifically, biasing pivot member 170 includes a brake section 169, a neutral section 171, and a steer section 173.

In FIG. 14, the rotation of drive shaft 34 causes biasing linkage 172 and biasing cam 174 to rotate pivot member 170. This rotation will move roller 167 to different sections of pivot member 170. In FIG. 14, drive shaft 34 has been rotated to the brake position, and roller 167 has moved to the brake section 169 of pivot member 170. Roller 170 is secured in this position by way of the force of spring 166 and the detent, or lip, at the left edge (with respect to FIGS. 14 and 15) of brake section 169 that prevents roller 167 from rolling down the top surface of pivot member 170 and into contact with neutral section 171. In order to release the brakes, a user steps on pedal 42 and rotates shaft 24 toward the neutral orientation. This rotation, in turn, forces roller 167 to overcome (i.e. travel up and over) the lip at the left edge of brake section 169. Once over this lip, the sloped nature of the surface between brake section 169 and neutral section 171 of pivot member 170 will transform the linear force of the spring 166 into a rotational force that urges drive shaft 34 back toward the neutral position. The shape of the top surface of pivot member 170 and the force of spring 166 ensure that the brakes are either in the completely neutral position or the completely brake position. Or, stated alternatively, spring 166 exerts a force that prevents the braking system from being in an intermediate position between the neutral position and the brake position. This helps prevent the undesired possibility of some, but not all, of the four brakes on the wheeled carriage being activated. In such situations, the carriage is only partially braked, which can cause undesired consequence if a user leans on the patient support apparatus with the expectation that it will not move due to its being fully braked.

FIG. 15 illustrates the drive shaft 34 rotated to a steer orientation. In this orientation, roller 167 is positioned in steer section 173 of the top surface of pivot member 170. In this steer orientation, the brakes are not activated and the caster wheels are free to both roll and swivel. In the steer orientation, however, the rotation of drive shaft 34 causes one or more auxiliary wheels 180 to move into contact with the ground or floor. Such auxiliary wheels aid in the steering of the patient support apparatus 21, and may be powered so as to reduce the amount of force required by a caregiver to move the patient support apparatus. The manner by which rotation of drive shaft 34 to the steer orientation causes the auxiliary wheels 180 to lower to the ground may take on any form. In one embodiment, drive shaft 34 is linked to the auxiliary wheels in the same manner as that disclosed in commonly assigned, U.S. Pat. No. 7,062,805 issued to Hopper et al., the complete disclosure of which is hereby incorporated herein by reference. Other manners of linking drive shaft 34 to auxiliary wheels 180 may also be used. Still further, in some embodiments, drive shaft 34 may be linked to a single auxiliary wheel 180, instead of a pair of auxiliary wheels. Such a linkage may take on any form, including, but not limited to, the construction shown in commonly assigned, U.S. Pat. No. 6,264,006 issued to Hanson et al., the complete disclosure of which is also incorporated herein by reference.

When shaft 34 is rotated to the braked orientation, a user supplies the necessary force to overcome the resistance offered by spring 166, as well as the biasing springs 108 within each brake assembly 26. Some of this energy is stored both in springs 108 and spring 166, which release the energy when a user begins to push on the pedal 36 sufficient to overcome the lip discussed above. Once the lip is overcome, the spring forces urge the brake system back to the disengaged position 38.

Alternatively, instead of or in addition to a foot pedal 36, an electromechanical construction may be employed for engaging and/or disengaging a brake lock assembly 26. For example, an electrical drive may be connected to a cam drive member 136, drive link 32, or a shaft 34 for imparting movement to cam 114.

In the illustrated embodiment brake member 44, actuating plate 48, and swivel lock plate 50 are constructed of metallic materials, with wheels 42 of locking caster wheel assemblies 22 being constructed of a partially compliant material, such as a hard rubberized or polymeric material. Also in the illustrated embodiment, swivel lock receiver 30 and plunger 112 and cam 114 of brake lock actuator 28 are additionally constructed of metallic materials. Although the use of metallic materials improves the robustness and reliability of the construction, alternative materials, such as plastic or polymeric type materials, may be employed for use with the noted components, or in combination with metallic materials, within the scope of the present invention.

The wheeled base of the wheeled carriage of the present invention is useful with any manner of patient support structures, with the braking system enabling the locking caster wheels to be precisely and simultaneously locked against rotation and swiveling. The integrated components of the brake lock assembly provide a single adjustable component that may be selectively engaged for simultaneous prevention of both rolling and swiveling of a caster wheel. The brake member of the brake lock assembly is readily and easily adjusted via convenient access to the adjusting bolt through the swivel lock plate without the need to disassemble components to access the bolt and/or release the bolt for adjustment. Both the brake lock assembly and brake lock actuator may be readily removed, such as for replacement of the brake member if required. The interlinked braking system construction enables accurate synchronization of the locking caster wheel assemblies such that all such interlinked locking caster wheels may be fully locked and unlocked together. Although shown in the illustrated embodiment as including four interlinked locking caster wheel assemblies, a wheeled carriage may include fewer than four such locking caster wheels and still operate as intended within the scope of the present invention.

Changes and modifications in the specifically described embodiments can be carried out without departing from the principles of the present invention which is intended to be limited only by the scope of the appended claims, as interpreted according to the principles of patent law including the doctrine of equivalents.

What is claimed is:

1. A patient support apparatus comprising:
   a base having a plurality of caster wheels;
   a support deck supported on said base, said support deck adapted to support a patient;
   a brake pedal movable between a brake position and a neutral position;
   a plurality of brakes movable between a locked position and an unlocked position, each one of said plurality of brakes associated with a respective one of said plurality of wheels, and each one of said plurality of brakes including a first biasing mechanism adapted to urge a respective brake toward the unlocked position; and
   a second biasing mechanism operatively linked to said brake pedal, said second biasing mechanism urging said brake pedal either toward said brake position or said neutral position such that said brake pedal is biased against remaining in any intermediate position between said brake position and said neutral position, said plurality of brakes moving to the locked position when said brake pedal is in the brake position, and said brakes moving to the unlocked position when said brake pedal is in the neutral position.

2. The apparatus of claim 1 wherein said plurality of brakes prevent both rotation and swiveling of said caster wheels when in said locked position.

3. The apparatus of claim 2 wherein said plurality of wheels include four wheels and said plurality of brakes includes four brakes.

4. The apparatus of claim 2 wherein said brakes prevent rotation of said wheels by frictionally engaging a surface on said wheels, and said brakes prevent swiveling of said wheels by moving a component into a blocking position that blocks swiveling movement of said wheels.

5. The apparatus of claim 4 wherein said component is a toothed structure and said blocking position is a position in which said toothed structure engages a toothed gear that would otherwise rotate when a wheel associated with said toothed gear swivels.

6. The apparatus of claim 1 wherein said brake pedal is located at a first end of said patient support apparatus, and said patient support apparatus includes a second brake pedal located at a second end of said patient support apparatus, said second brake pedal operatively coupled to said brake pedal such that said brake pedal and said second brake pedal move in tandem between said neutral position and said brake position.

7. The apparatus of claim 1 wherein said first biasing mechanism includes a spring adapted to urge a pivotal lock assembly about a pivot axis.

8. The apparatus of claim 7 wherein said pivotal lock assembly includes teeth on a first end thereof that are adapted to selectively engage a gear and to prevent swiveling of the respective wheel when engaged therewith.

9. The apparatus of claim 8 wherein said pivotal lock assembly includes a frictional brake on a second end thereof that is adapted to selectively engage a surface of the respective wheel.

10. The apparatus of claim 1 further including a drive shaft connected to said brake pedal, said drive shaft including a first orientation corresponding to said brake pedal neutral position and a second orientation corresponding to said brake pedal brake position, said second biasing mechanism including a single spring that exerts a rotational biasing force on said drive shaft urging said drive shaft away from any intermediate orientation between said first and second orientations.

11. A wheeled carriage for supporting a patient, said wheeled carriage comprising:
   a wheeled base having frame members and supporting a plurality of caster wheel assemblies, each said caster wheel assembly including a wheel; and
   a braking system, said braking system including a moveable brake lock assembly, a brake lock actuator, and a swivel lock receiver, with said brake lock assembly, said brake lock actuator and said swivel lock receiver being operatively connected to one of said caster wheel assemblies to define a locking caster wheel assembly, said brake lock assembly comprising:

an actuating member, a swivel lock member, and a brake member, with said actuating member, said swivel lock member, and said brake member being interconnected as a unit for simultaneous movement;

said brake lock actuator operable to selectively move said brake lock assembly into an engaged position via engagement with said actuating member, with said swivel lock member engaging said swivel lock receiver and said brake member contacting said wheel of said locking caster wheel assembly thereby preventing rotation and swiveling of said wheel of said locking caster wheel assembly when said brake member is in said engaged position.

12. The wheeled carriage of claim 11 wherein said actuating member comprises an actuating plate and said swivel lock member comprises a swivel lock plate, and wherein said swivel lock plate is joined to said actuating plate, and said brake member is joined to said actuating plate.

13. The wheeled carriage of claim 12 wherein said brake lock assembly further includes an adjusting bolt having a bolt head, said adjusting bolt connecting said brake member to said actuating plate and enabling adjustment of the position of said brake member relative to said adjusting plate, and wherein said swivel lock plate at least partially covers said bolt head to retain said adjusting bolt and prevent axial movement of said adjusting bolt relative to said actuating plate.

14. The wheeled carriage of claim 13 wherein said swivel lock plate includes an access aperture aligned with said bolt head, said access aperture enabling access to said adjustment bolt whereby said adjustment bolt may be rotated to adjust the position of said brake member relative to said adjusting plate.

15. The wheeled carriage of claim 12 wherein said swivel lock plate includes at least one projecting member, said projecting member is selectively engageable with said swivel lock receiver, and wherein said swivel lock receiver comprises a circumferential lock gear and said swivel lock plate includes a rack member, said rack member including a plurality of projecting members for selective engagement with said lock gear.

16. The wheeled carriage of claim 11 wherein said locking caster wheel assembly includes a caster leg body having a pair of spaced members between which said brake lock assembly is received, and wherein each of said spaced members include a mounting aperture, and wherein said brake lock assembly includes a mounting passage with said mounting passage being aligned with said mounting apertures when said brake lock assembly is received between said spaced members, and wherein said brake lock assembly is secured to said caster leg body by a mounting pin with said brake lock assembly adapted for pivoting movement on said mounting pin relative to said caster leg body.

17. The wheeled carriage of claim 16 wherein said brake lock assembly further includes a biasing member, said biasing member acting on said brake lock assembly to pivot said brake lock assembly into a disengaged position in which said wheel of said locking caster wheel assembly is able to swivel and rotate.

18. The wheeled carriage of claim 11 wherein said brake lock assembly is affixed to said locking caster wheel assembly to swivel with said wheel of said locking caster wheel assembly, and wherein said brake lock actuator is fixed relative to swiveling rotation of said wheel of said locking caster wheel assembly, and wherein said brake lock actuator includes a rotatable cam and a plunger, with rotation of said cam causing extension of said plunger to move said brake lock assembly into said engaged position.

19. The wheeled carriage of claim 18 wherein said brake lock actuator further includes a cam housing with said plunger extending through said cam housing, said cam housing includes a plunger guide configured to prevent rotation of said plunger relative to said cam housing, said plunger includes a cam follower with said cam follower contacting said cam, and said cam follower comprises an elongate and radiused edge member.

20. The wheeled carriage of claim 19 wherein said plunger engages a detent on said actuating member.

21. The wheeled carriage of claim 19 further including a foot pedal and a drive link, wherein said foot pedal drives said cam drive member and wherein said drive link is connected to said cam drive member and said foot pedal.

22. A wheeled carriage for supporting a patient, said wheeled carriage comprising:

a wheeled base having frame members and supporting a plurality of caster wheel assemblies each including a wheel, two of said caster wheel assemblies comprising a first pair of locking caster wheel assemblies, each said locking caster wheel assembly including a moveable brake lock assembly, a brake lock actuator, and a swivel lock receiver, and with said brake lock assembly comprising:

an actuating member, a swivel lock member, and a brake member, with said actuating member, said swivel lock member, and said brake member being interconnected as a unit for simultaneous movement;

said brake lock actuator operable to selectively move said brake lock assembly into an engaged position via engagement with said actuating member, with said swivel lock member engaging said swivel lock receiver and said brake member contacting said wheel of said locking caster wheel assembly thereby preventing rotation and swiveling of said wheel of said locking caster wheel assembly when said brake member is in said engaged position;

a drive link operatively interconnecting said brake lock actuators of said first pair of locking caster wheel assemblies, said drive link being operable to simultaneously actuate both said brake lock actuators whereby both said brake lock assemblies are moved to said engaged position.

23. The wheeled carriage of claim 22 wherein each said brake lock actuator includes a rotatable cam and each said locking caster wheel assembly further includes a cam drive member connected to said cam, and wherein said drive link is connected to said cam drive members of each said first pair of locking caster wheel assemblies.

24. The wheeled carriage of claim 22 wherein each said actuating member comprises an actuating plate and each said swivel lock member comprises a swivel lock plate, and wherein for each said brake lock assembly said swivel lock plate is joined to said actuating plate and said brake member is joined to said actuating plate.

25. The wheeled carriage of claim 24 wherein each said brake lock assembly further includes an adjusting bolt having a bolt head, said adjusting bolt connecting said brake member to said actuating plate and enabling adjustment of the position of said brake member relative to said adjusting plate, and wherein said swivel lock plate at least partially covers said bolt head to retain said adjusting bolt and prevent axial movement of said adjusting bolt relative to said actuating plate.

26. The wheeled carriage of claim 25 wherein each said swivel lock plate includes an access aperture aligned with said bolt head, said access aperture enabling access to said adjustment bolt whereby said adjustment bolt may be rotated to adjust the position of said brake member relative to said adjusting plate.

27. The wheeled carriage of claim 24 wherein each said swivel lock plate includes at least one projecting member, said projecting member being selectively engaged with the respective said swivel lock receiver.

28. The wheeled carriage of claim 27 wherein each said swivel lock receiver comprises a circumferential lock gear and each said swivel lock plate includes a rack member, said rack member including a plurality of projecting members for selective engagement with the respective said lock gear.

29. The wheeled carriage of claim 22 wherein each said locking caster wheel assembly includes a caster leg body having a pair of spaced members between which said brake lock assembly is received, and wherein each of said spaced members include a mounting aperture, and wherein each said brake lock assembly includes a mounting passage with said mounting passage of each said brake lock assembly being aligned with respective said mounting apertures when said brake lock assembly is received between said spaced members, and wherein each said brake lock assembly is secured to a respective said caster leg body by a mounting pin with said brake lock assembly adapted for pivoting movement on said mounting pin relative to said caster leg body.

30. The wheeled carriage of claim 29 wherein each said brake lock assembly is affixed to a respective said locking caster wheel assembly to swivel with said wheel of said locking caster wheel assembly, and wherein each said brake lock actuator is fixed relative to swiveling rotation of said wheel of said locking caster wheel assembly, and wherein each said brake lock actuator includes a plunger with rotation of said cam causing extension of said plunger to move said brake lock assembly into said engaged position.

31. The wheeled carriage of claim 30 wherein each said brake lock actuator further includes a cam housing with said plunger extending through said cam housing, said cam housing including a plunger guide configured to prevent rotation of said plunger relative to said cam housing.

32. The wheeled carriage of claim 31 wherein said plunger includes a cam follower contacting said cam, said cam follower comprising an elongate and radiused edge member, and wherein said plunger engages a detent on said actuating member.

\* \* \* \* \*